(12) United States Patent
Salas

(10) Patent No.: US 11,787,345 B1
(45) Date of Patent: Oct. 17, 2023

(54) DASHBOARD HAT RACK

(71) Applicant: Joshua Salas, Stuart, FL (US)

(72) Inventor: Joshua Salas, Stuart, FL (US)

( * ) Notice: Subject to any disclaimer, the term of this patent is extended or adjusted under 35 U.S.C. 154(b) by 0 days.

(21) Appl. No.: 17/731,519

(22) Filed: Apr. 28, 2022

(51) Int. Cl.
*B60R 7/10* (2006.01)
*B60R 7/06* (2006.01)

(52) U.S. Cl.
CPC . *B60R 7/10* (2013.01); *B60R 7/06* (2013.01)

(58) Field of Classification Search
CPC ..... B60R 7/10; B60R 7/06; B60R 2011/0087; B60R 2011/0084; B60R 2011/0005; B60R 11/02
See application file for complete search history.

(56) References Cited

U.S. PATENT DOCUMENTS

| | | | | |
|---|---|---|---|---|
| RE20,448 E | * | 7/1937 | Van Aken | A47G 25/10 211/32 |
| 4,105,246 A | * | 8/1978 | Trumbull | B60R 7/06 296/97.7 |
| 4,552,399 A | * | 11/1985 | Atarashi | E05B 77/06 292/DIG. 22 |
| 4,757,905 A | | 7/1988 | Green | |
| 7,168,577 B1 | | 1/2007 | Moseley | |
| 8,172,293 B2 | * | 5/2012 | Lota | B60R 11/02 224/483 |
| 8,910,990 B1 | * | 12/2014 | Oldani | G06F 1/1632 296/70 |
| 10,967,807 B1 | * | 4/2021 | Hessheimer | B60R 11/0241 |
| 2014/0203585 A1 | * | 7/2014 | Sofield | B60R 7/06 296/37.12 |
| 2016/0272122 A1 | * | 9/2016 | Dunham | B60R 11/02 |
| 2017/0123203 A1 | * | 5/2017 | Klabukov | B60R 1/00 |
| 2017/0282812 A1 | * | 10/2017 | Yoshimura | H05K 5/0204 |
| 2017/0315354 A1 | * | 11/2017 | Park | B60K 35/00 |
| 2020/0062191 A1 | * | 2/2020 | Ragner | H04B 1/3877 |

* cited by examiner

*Primary Examiner* — Brian D Nash
(74) *Attorney, Agent, or Firm* — Sanchelima & Associates PA; Christian Sanchelima; Jesus Sanchelima

(57) ABSTRACT

A dashboard hat rack including a hat rack assembly, a pivoting assembly, and a base assembly. The hat rack assembly includes a hat rack. The hat rack has the shape of a horseshoe. The pivoting assembly includes a pivot. The hat rack assembly and the base assembly are hingedly attached through the pivoting assembly. The pivot moves the hat rack up and down from a lower configuration to an upright configuration. A hat is held by the hat rack in the upright configuration. The base assembly includes a base. The base can be mounted in the dashboard of a car. In the lower configuration the hat rack is in abutting contact with said base. In the upright configuration the hat rack is parallel to the base.

1 Claim, 4 Drawing Sheets

US 11,787,345 B1

DASHBOARD HAT RACK

BACKGROUND OF THE INVENTION

1. Field of the Invention

The present invention relates to a dashboard hat rack and, more particularly, to a dashboard hat rack that hingedly pivots from a lower configuration to an upright position.

2. Description of the Related Art

Several designs for a dashboard hat rack have been designed in the past. None of them, however, include a button to actuate a hinge to take the present invention to an upright position.

Applicant believes that a related reference corresponds to U.S. Pat. No. 7,168,577 issued for a cap storage and display assembly that mounts to a wall or the like surface. Applicant believes that another related reference corresponds to U.S. Pat. No. 4,757,905 issued for a portable hat rack that is mountable to the seat of an automobile. None of these references, however, teach of a dashboard holder hat holder comprising a horseshoe shaped article having a hinged base which is configured to mount to the top of a vehicle dashboard, wherein that holder is configured to hingedly pivot to an upright position for holding hats.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a dashboard hat rack that includes a hat rack with the shape of a horseshoe to hold a hat.

It is another object of this invention to provide a dashboard hat rack that includes fasteners in the base to be fixed to the dashboard of a car.

It is still another object of the present invention to provide a dashboard hat rack that includes a It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
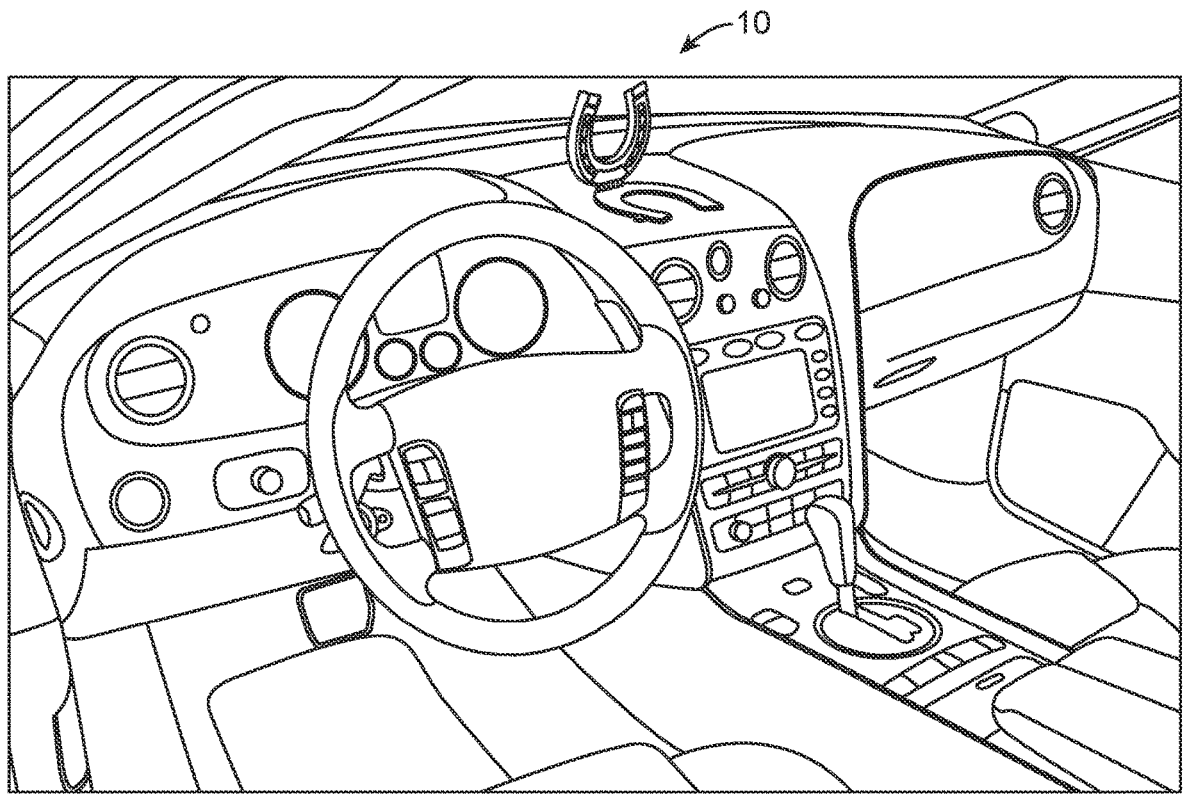
FIG. 1 represents an isometric operational view of the present invention 10 mounted to the top of a dashboard of a car.

Referring now to the drawings, where the present invention is generally referred to with numeral 10, it can be observed that it basically includes a hat rack assembly 20, a pivoting assembly 40 and a base assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
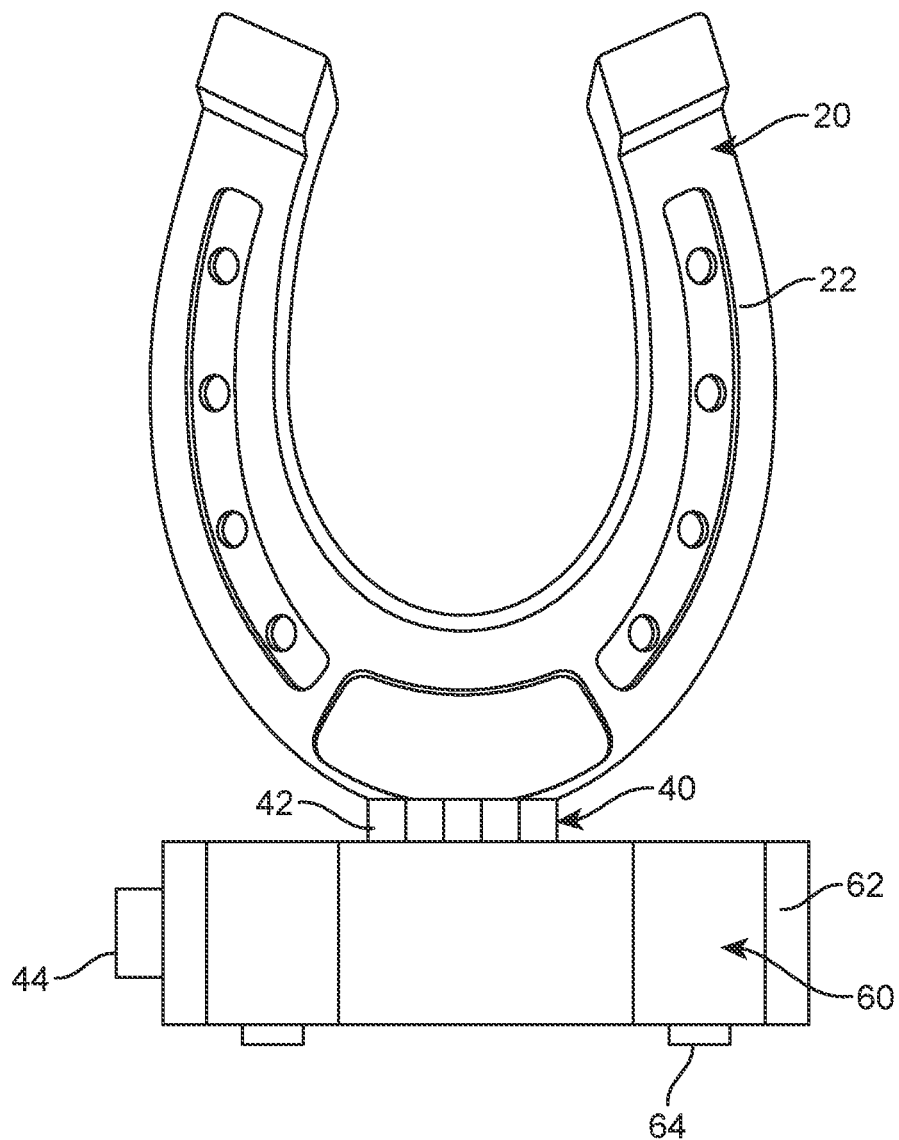
FIG. 2 shows a front view of the present invention 10. The present invention includes a hat rack assembly 20, a pivoting assembly 40 and a base assembly 60.

Referring to FIG. 2 the hat rack assembly 20 may include a hat rack 22. The hat rack 22 may be a narrow band in the form of an extended circular arc to conform with the shape of a horseshoe. It may be suitable for the hat rack 22 to have openings to emulate the openings in a horseshoe. It also may be suitable for the hat rack 22 to have a rectangular shape, a triangular shape, an ornamental figure shape or any other suitable shape. In a preferred embodiment the hat rack 22 may be made of iron. It also may be suitable for the hat rack 22 to be made of aluminum, steel, plastic, wood, or any other suitable material. The hat rack 22 may have a proximal end 24 and a distal end 26. The proximal end 24 of the hat rack 22 may conform with the shape of a toe end of a horseshoe. The distal end 26 of the hat rack 22 may conform with the shape of a heel end of a horseshoe. The proximal end 24 of the hat rack 22 may be hingedly attached to the base assembly 60 through the pivoting assembly 40.

The pivoting assembly 40 may include a pivot 42 and a button 44. The pivot 42 may allow the hat rack assembly to rotate upwards and downwards to the base assembly 60. The pivoting assembly 40. The pivot 42 may be attached to the proximal end 24 of the hat rack 22. The pivot 42 may be attached to the base assembly 60. The pivoting assembly 40 may connect the hat rack assembly 20 to the base assembly 60. In a preferred embodiment the pivot 42 is a spring hinge. The pivot 42 may be made of steel, iron, plastic, or any other suitable material. The pivot 42 may be actuated to rotate the hat rack 22 from a lower configuration to an upright configuration. The pivot 42 may be actuated to rotate the hat rack 22 from an upright configuration to a lower configuration. The pivot 42 may be actuated using a pneumatic actuation mechanism, an electric actuation mechanism, a hydraulic actuation mechanism, or any other actuation mechanism.

In a preferred embodiment the button 44 may be located on a left side of the base assembly 60. It also may be suitable for the button 44 to have any other configuration in the base assembly 60. The button 44 may move inwards and outwards of the base assembly 60 to be pressed. The button 44 may be pressed to release the hat rack 22 from a lower configuration to an upright configuration. In the lower configuration the hat rack 22 may be parallelly over the base assembly 60. In an upright configuration the hat rack 42 may be perpendicular to the base assembly 60. In an upright configuration a hat may be held for the hat rack 22.

Figure 3:
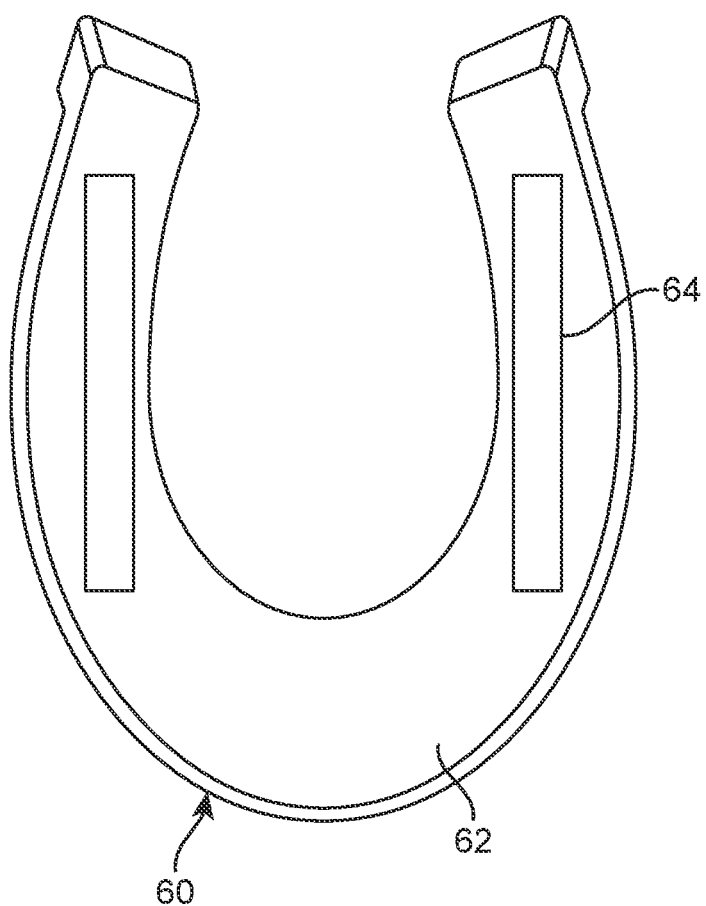
FIG. 3 illustrates a bottom view of the base assembly 60. The base assembly 60 includes a base 62 and fasteners 64.
Figure 4:
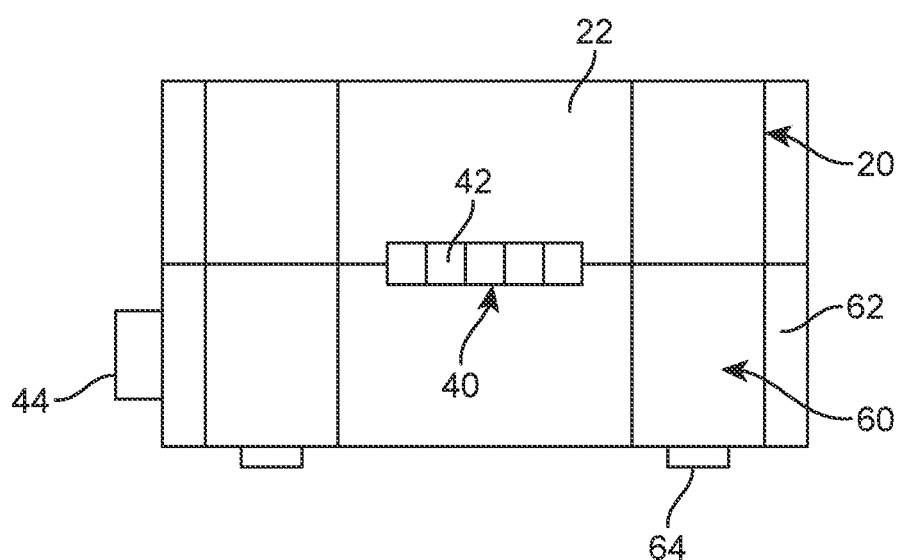
FIG. 4 is a representation of a front view of the present invention 10 having the hat rack assembly 20 in a lower configuration.

Referring now to FIG. 3, the base assembly 60 may include a base 62 and fasteners 64. In a preferred embodiment the hat rack may be a narrow band in the form of an extended circular arc to conform with the shape of a horseshoe. It also may be suitable for the base 62 to have a rectangular shape, a triangular shape, an ornamental figure shape, or any other suitable shape. In a preferred embodiment the base 62 may be made of iron. It also may be suitable for the base 62 to be made of aluminum, steel, plastic, wood, or any other suitable material. The base 62 may have a proximal end 68 and a distal end 66. The proximal end 68 of the base 62 may conform with the shape of a toe end of a horseshoe. The distal end 66 of the base 62 may conform with the shape of a heel end of a horseshoe. The proximal end 68 of the base 62 may be hingedly attached to the base proximal end 24 of the hat rack 22 through the pivoting assembly 40. In the lower configuration the front wall of the hat rack 22 may be in abutting contact with the top wall of the base 62, as shown in FIG. 4. The base 62 may be fixed to a top of a vehicle dashboard using the fasteners 64.

The fasteners 64 may be located on a bottom portion of the base 62. In a preferred embodiment the fasteners 64 may be a double-sided tape. It also may be suitable for the fasteners 64 to be screws, nails, hook and loop fastener, or any other suitable fastener known in the prior art. In a preferred embodiment the base 62 may be fixed to the dashboard of a car. In a preferred embodiment the button 44 may be pressed to make the hat rack 22 go from the lower configuration to the upright configuration or from the upright configuration to the lower configuration. In the upright configuration a hat can be held by the hat rack 22.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A dashboard hat rack, consisting of
   a hat rack assembly, wherein said hat rack assembly includes a hat rack, wherein said hat rack is a narrow band in the form of an extended circular arc to conform with the shape of a horseshoe, said hat rack has an upright configuration and a lower configuration, a hat is hold by said hat rack in said upright configuration;
   a pivoting assembly, wherein said pivoting assembly includes a pivot and a button, said pivot is configured to move said hat rack up and down from said lower configuration to said upright configuration by means of an actuation mechanism, said button is configured to actuate said actuation mechanism, said pivot is a spring hinge; and
   a base assembly, wherein said base assembly includes a base and fasteners, said base conforms with the shape of said horseshoe, said base is configured to be mounted to the dashboard of a car by means of said fasteners, said fasteners are double-sided tape, in said lower configuration a front wall of said hat rack is in abutting contact with a top wall of said base, in said upright configuration said hat rack is perpendicular to said base, said base is hingedly attached to said hat rack assembly by means of said pivoting assembly.

* * * * *